US012576930B2

(12) United States Patent
Michael

(10) Patent No.: US 12,576,930 B2
(45) Date of Patent: Mar. 17, 2026

(54) TRACTION CLEAT FOR VEHICLE TRACKS

(71) Applicant: Edgar Michael, Verona, VA (US)

(72) Inventor: Edgar Michael, Verona, VA (US)

( * ) Notice: Subject to any disclaimer, the term of this patent is extended or adjusted under 35 U.S.C. 154(b) by 426 days.

(21) Appl. No.: 17/181,764

(22) Filed: Feb. 22, 2021

(65) Prior Publication Data

US 2022/0266932 A1     Aug. 25, 2022

(51) Int. Cl.
*B62D 55/28*          (2006.01)

(52) U.S. Cl.
CPC .................................. *B62D 55/286* (2013.01)

(58) Field of Classification Search
CPC ..... B62D 55/28; B62D 55/283; B62D 55/286
See application file for complete search history.

(56) References Cited

U.S. PATENT DOCUMENTS

| | | | | |
|---|---|---|---|---|
| 7,901,015 B1 * | 3/2011 | Anderson | .............. | B62D 55/28 |
| | | | | 305/51 |
| 9,862,436 B2 * | 1/2018 | Burling | ................ | B62D 55/286 |
| 9,950,757 B2 * | 4/2018 | Tibbits | .................... | B62D 55/28 |
| 10,625,798 B2 * | 4/2020 | Lafreniere | ............. | B62D 55/28 |
| 10,967,925 B2 * | 4/2021 | Wilson | ................. | B62D 55/286 |
| 11,136,078 B2 * | 10/2021 | Jee | ........................ | B62D 55/275 |
| 11,390,341 B2 * | 7/2022 | Burling | .................. | B62D 55/28 |
| 2022/0017164 A1 * | 1/2022 | Burling | .................. | B62D 55/28 |

* cited by examiner

*Primary Examiner* — Jason R Bellinger
(74) *Attorney, Agent, or Firm* — Dale Jensen

(57)          ABSTRACT

Certain exemplary embodiments can provide a system including a vehicle, a track, and a set of cleats. The track is coupleable to the vehicle and the set of cleats is coupleable to the track. Each cleat includes a first portion and a second portion. The cleat can be coupled to the track via coupling the first portion to the second portion.

4 Claims, 9 Drawing Sheets

2400

2600

5000

5100

5000

5100

5000

5100

TRACTION CLEAT FOR VEHICLE TRACKS

CROSS-REFERENCES TO RELATED APPLICATIONS

This application claims priority to, and incorporates by reference herein in its entirety, U.S. Provisional Patent Application Ser. No. 62/980,197, filed Feb. 22, 2020.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a system comprising a set of cleats that is coupleable to a track of a vehicle, such as a skid-steer loader. Via the set of cleats coupled to the track of the vehicle, wear of the track is reduced and traction is improved. Traction is improver particularly on unpaved surfaces that are slick. In situations where vehicle control is important, the use of the set of cleats on the track can improve results in the use of the vehicle.

Certain exemplary embodiments can provide a system comprising a vehicle, a track, and a set of cleats. The track is coupleable to the vehicle and the set of cleats is coupleable to the track. Each cleat comprises a first portion and a second portion. The cleat can be coupled to the track via coupling the first portion to the second portion.

Figure 1:
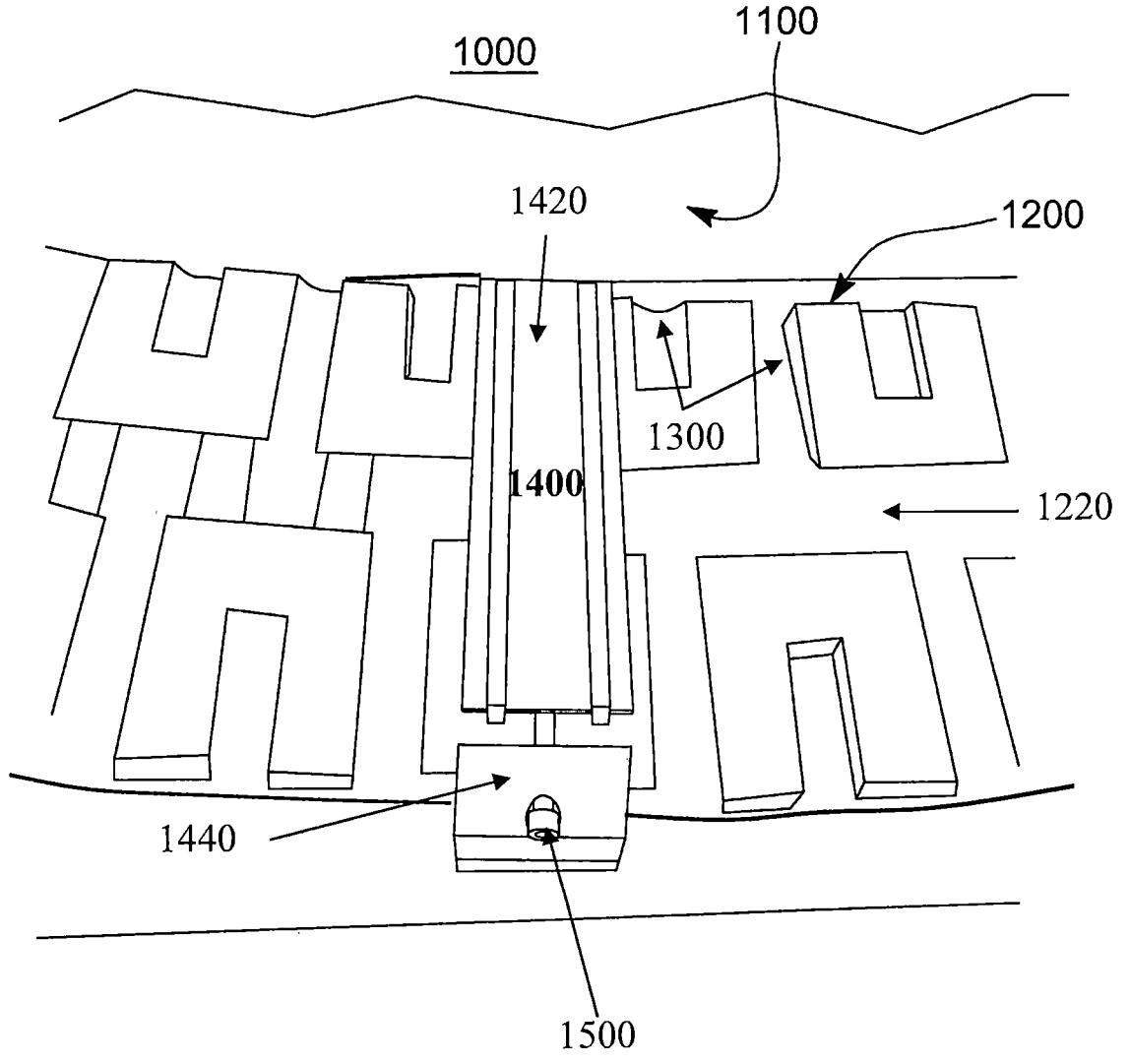
FIG. 1 is a perspective view of an exemplary embodiment of a system 1000.

FIG. 1 is a perspective view of an exemplary embodiment of a system 1000, which comprises a vehicle 1100 (e.g., a skid-steer loader). Vehicle 1100 comprises a track 1200, which in the illustrated embodiment comprises rubber and/or elastomer compounds. Track 1200 defines a plurality of channels 1300, via which a cleat 1400 can be mounted. Cleat 1400 can comprise a first portion 1420 and a second portion 1440. Certain exemplary embodiments can comprise just first portion 1420 and second portion 1440. Other embodiments can comprise a detachable end piece like second portion 1440 on each end of cleat 1400. A threaded fastener 1500 is used in the illustrated embodiment to couple cleat 1400 to track 1200. In the illustrated embodiment, threaded fastener 1500 is a socket head cap screw.

The use of a plurality of cleats such as cleat 1400 allows for improved traction of vehicle 1100 on slick surfaces. The plurality of cleats can be installed adjacent to each other as spacing of the plurality of channels 1300 allows. The use of a plurality of cleats such as cleat 1400 can improve wear of track 1200 and/or resist tearing of track 1200.

Figure 2:
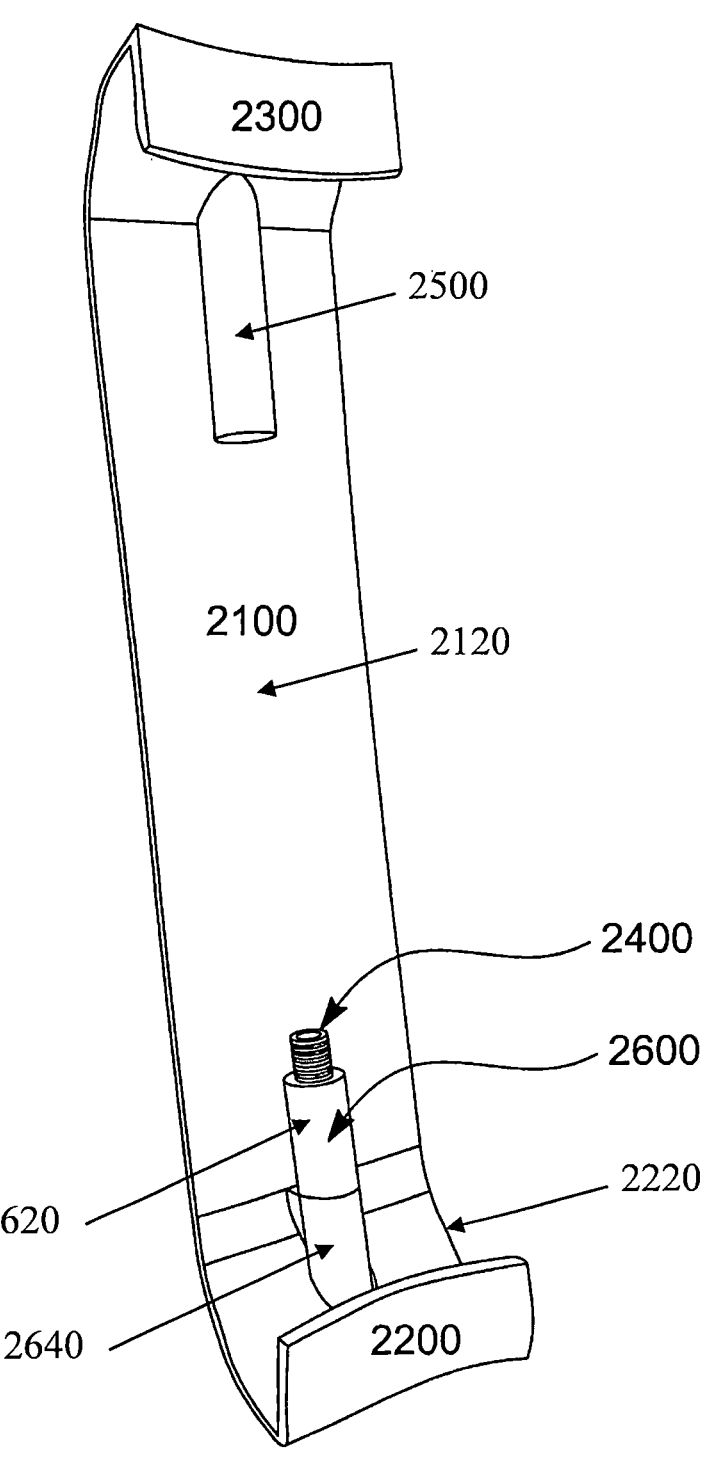
FIG. 2 is a perspective view of an exemplary embodiment of a system 2000.

FIG. 2 is a perspective view of an exemplary embodiment of a system 2000, which comprises a cleat 2100. Cleat 2100 comprises:

a first portion 2120 comprising an first track retainer 2300;

a second portion 2220 comprising a second track retainer 2200;

a threaded fastener 2400;

a first retainer ridge 2500; and a second retainer ridge 2600.

Threaded fastener 2400 can be utilized to couple second portion 2220 to first portion 2120 of cleat 2100 via second retainer ridge 2600. Second retainer ridge 2600 has a threaded component that is constructed to engage with threaded fastener 2400. In the illustrated embodiment, threaded fastener 2400 is a socket head cap screw. In certain exemplary embodiments, threaded fastener 2400 can have a diameter of approximately ½ inch and a length of approximately 1 inch. Dimensions of threaded fastener 2400 can be selected to correspond and/or be compatible with a width of a track channel (see, e.g., widths of plurality of channels 1300).

First retainer ridge 2500 and second retainer ridge 2600 are constructed for placement in channels of a track of a vehicle (e.g., a skid-steer loader).

Certain exemplary embodiments provide a system comprising:

a vehicle (see, vehicle 1100 of FIG. 1);

a track (see, track 1200 of FIG. 1), the track coupleable to the vehicle;

cleat 2100 comprising first portion 2120 and second portion 2220, cleat 2100 coupleable to the track via coupling first portion 2120 to second portion 2220, first portion 2120 of cleat 2100 comprising first track retainer 2300, second portion 2220 of cleat 2100 comprising second track retainer 2200, each of first track retainer 2300 and the second track retainer 2200 constructed to wrap around an edge of the track, first portion 2120 of cleat 2100 comprising first retainer ridge 2500, first retainer ridge 2500 constructed to engage with a first channel (see, channels 1300 of FIG. 1) of the track, first portion 2120 of cleat 2100 comprising a first part 2620 of second retainer ridge 2600, second portion 2220 of cleat 2100 comprising a second part 2640 of second retainer ridge 2600, second retainer ridge 2600 constructed to engage with a second channel (see, channels 1300 of FIG. 1) of the track;

wherein:

first portion 2120 is coupleable to second portion 2220 via threaded fastener 2400 engaging with a threaded surface defined by second retainer ridge 2600;

when first retainer ridge 2500 is engaged with first channel of the track and second retainer ridge 2600 is engaged with the second channel of the track, cleat 2100 is restrained from motion in any direction relative to the track.

Figure 5:
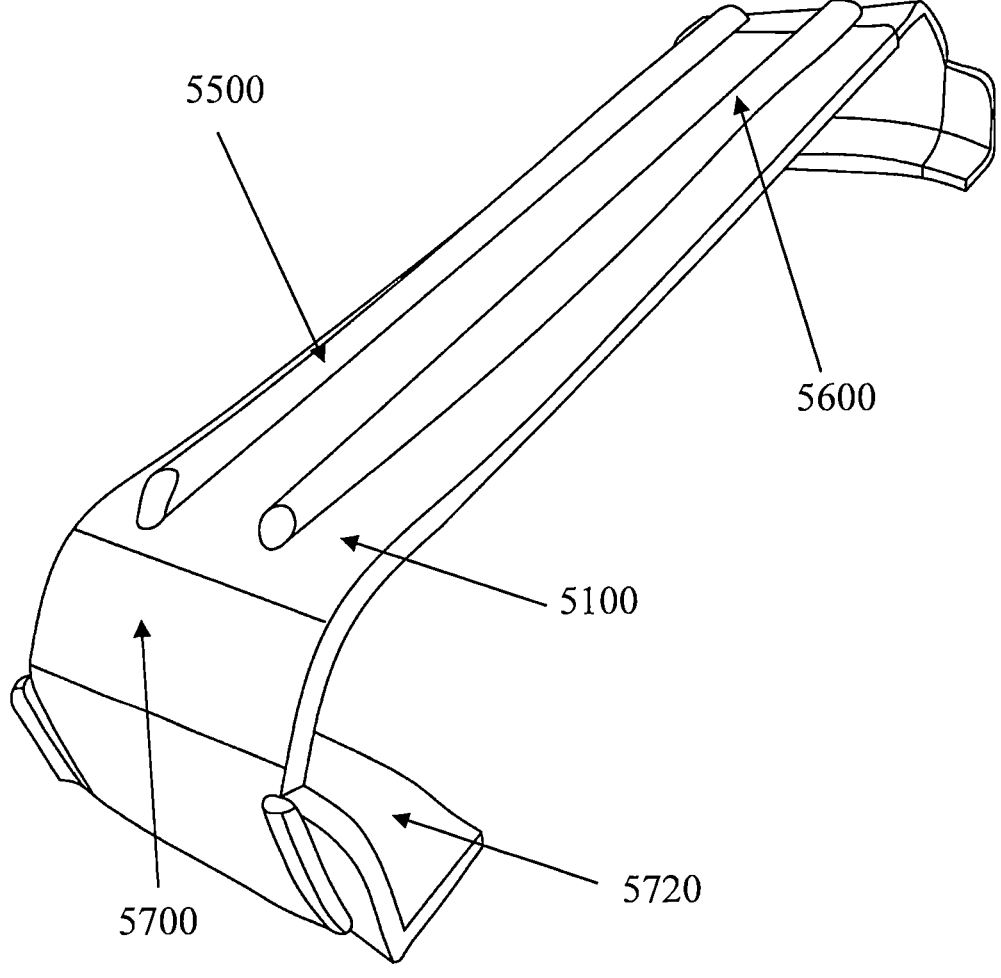
FIG. 5 is a perspective view of an exemplary embodiment of a system 5000.

In certain exemplary embodiments, cleat 2100 comprises a pair of grabber ridges (see, first grabber ridge 5500 and second grabber ridge 5600 of FIG. 5) along a length of cleat 2100, the pair of grabber ridges constructed to penetrate unpaved surfaces and thereby increase traction of cleat 2100.

In certain exemplary embodiments, each of first track retainer 2300 and second track retainer 2200 comprise an end portion having an angle component (see, end portion 5700 and angle component 5720 of FIG. 5) with a width that is greater than a width of a segment of cleat 2100 that is adjacent to an outer surface of the track (see, outer surface 1220 of track 1200 of FIG. 1).

Figure 4:
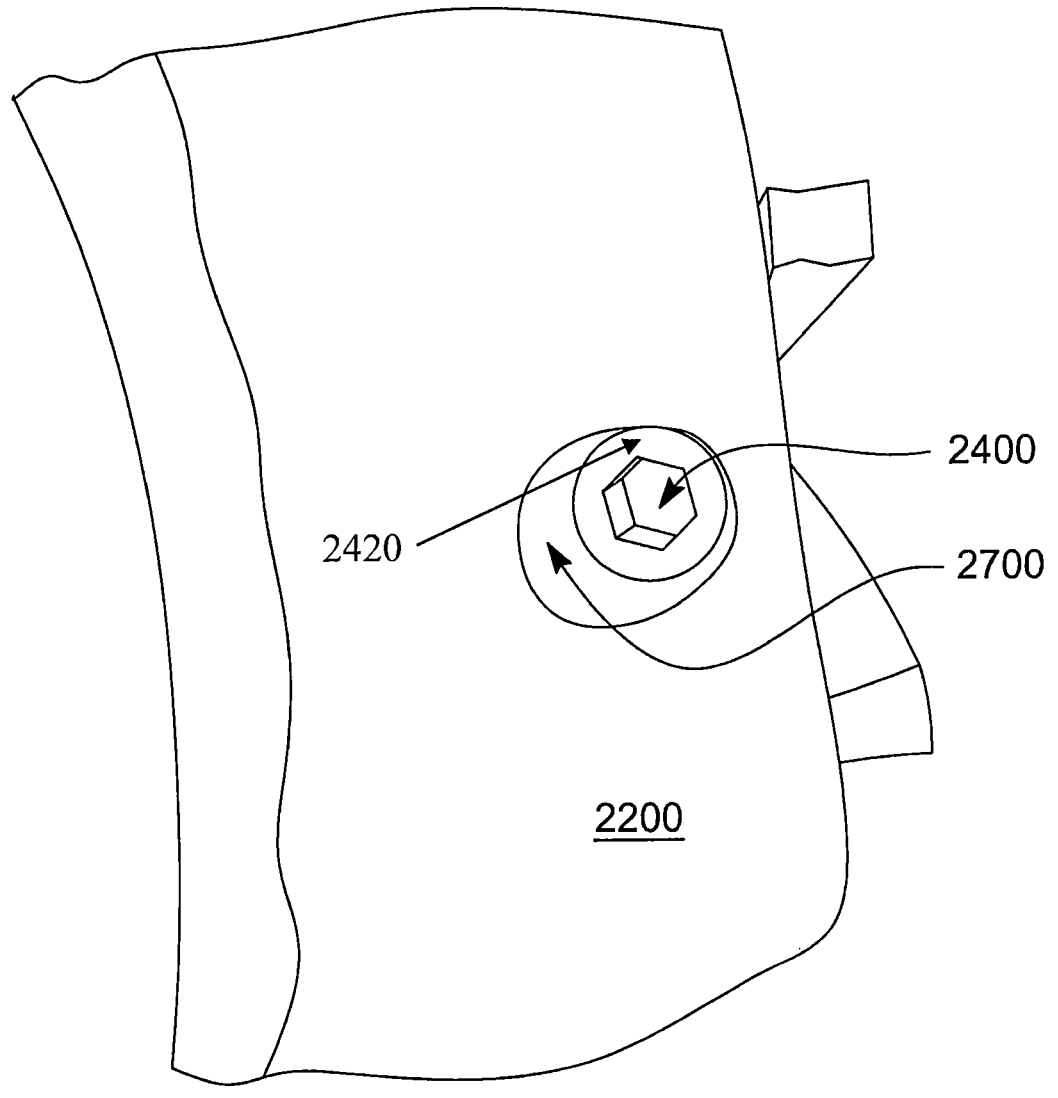
FIG. 4 is a perspective view of system 2000.

In certain exemplary embodiments, threaded fastener 2400 has a countersunk head 2420 (see, e.g., FIG. 4).

Figure 3:
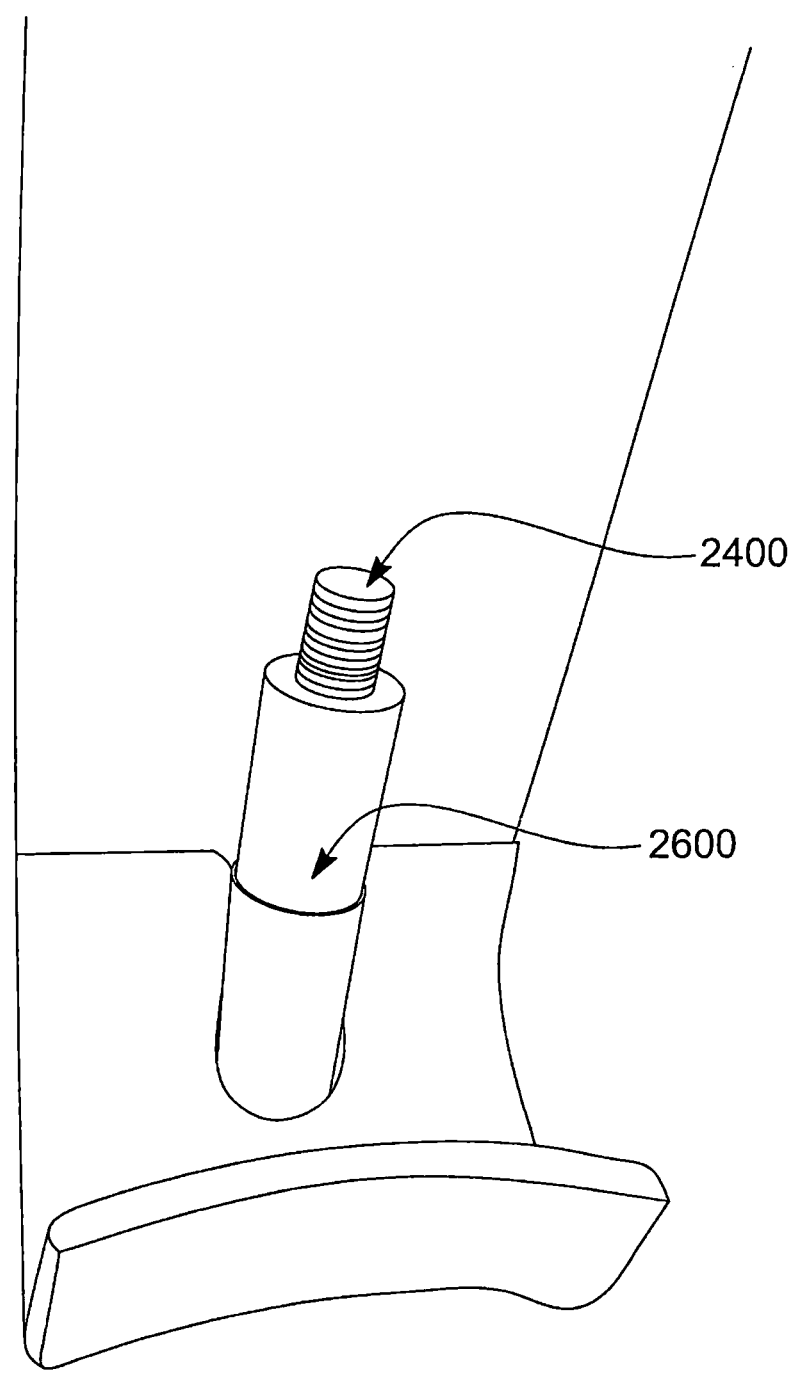
FIG. 3 is a perspective view of system 2000.

FIG. 3 is a perspective view of system 2000, which illustrates a magnified view of threaded fastener 2400 engaged with second retainer ridge 2600.

FIG. 4 is a perspective view of system 2000, which illustrates an end view of threaded fastener 2400 installed in second track retainer 2200 via a countersunk aperture 2700. Threaded fastener 2400 can comprise a countersunk head 2420.

FIG. 5 is a perspective view of an exemplary embodiment of a system 5000, which comprises a first grabber ridge 5500, a second grabber ridge 5600, an end portion 5700, and an angle component 5720. A depth of first grabber ridge 5500 and second grabber ridge 5600 is variable depending upon user desires for traction on unpaved surfaces. In certain exemplary embodiments the depth of first grabber ridge 5500 and second grabber ridge 5600 can be approximately ¼ inch. When utilized on vehicle tracks, first grabber ridge 5500 and second grabber ridge 5600 penetrate unpaved surfaces on which the vehicle operates and, thereby, improve traction of the vehicle on such surfaces. In certain exemplary embodiments, first grabber ridge 5500 and second grabber ridge 5600 can be weld beads applied to a surface of cleat 5100.

Figure 6:
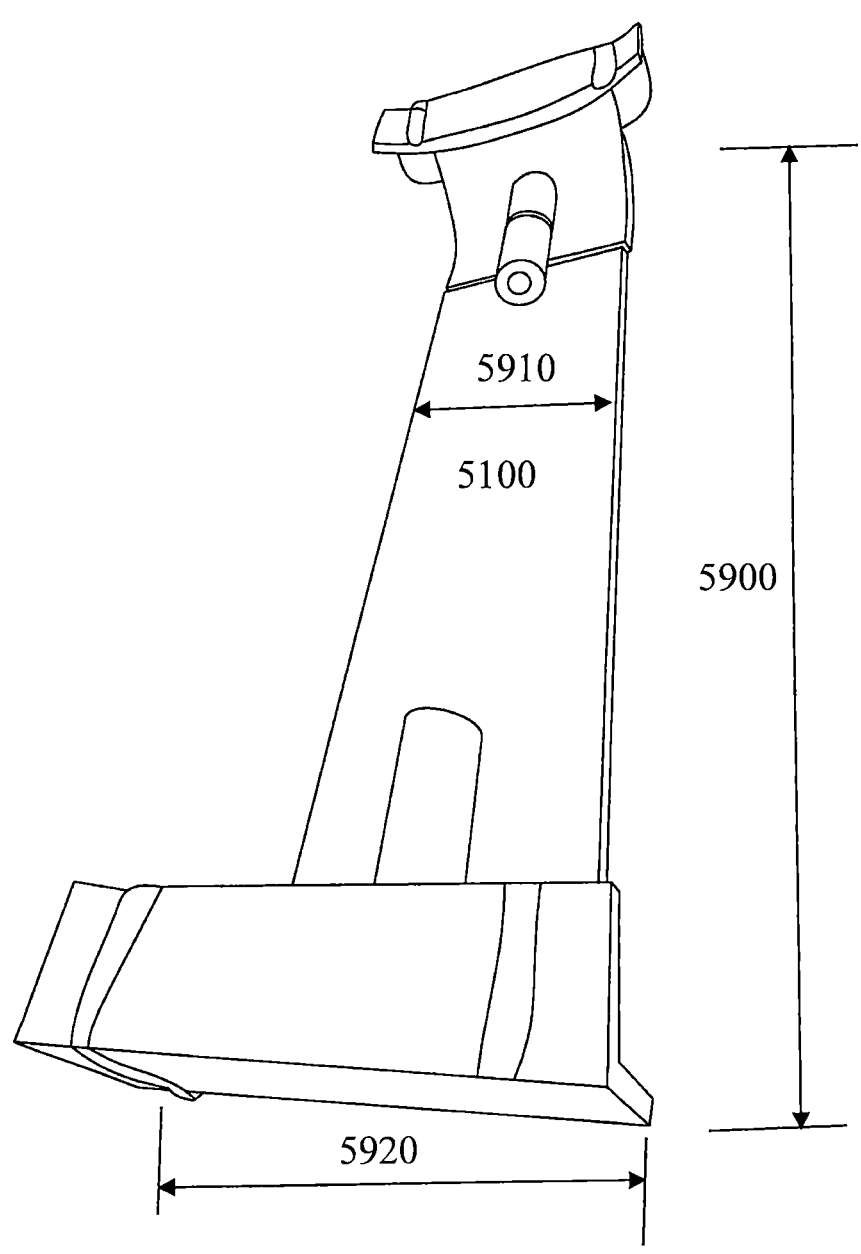
FIG. 6 is a perspective view of system 5000.

FIG. 6 is a perspective view of system 5000, which comprises a cleat 5100. Dimensions of cleat 5100 are determined based upon dimension of a vehicle track to which cleat 5100 will be coupled. An exemplary cleat sized to fit an exemplary skid steer loader can have an overall length 5900 of approximately 18 inches, an pad width 5910 of approximately 4 inches along a majority of the length of cleat 5100. An end width 5920 of cleat 5100 can be approximately 5½ inches. In embodiments where end width 5920 is greater than pad width 5910, additional resistance to torsion is present when cleat 5100 is coupled to a vehicle track.

Figure 7:
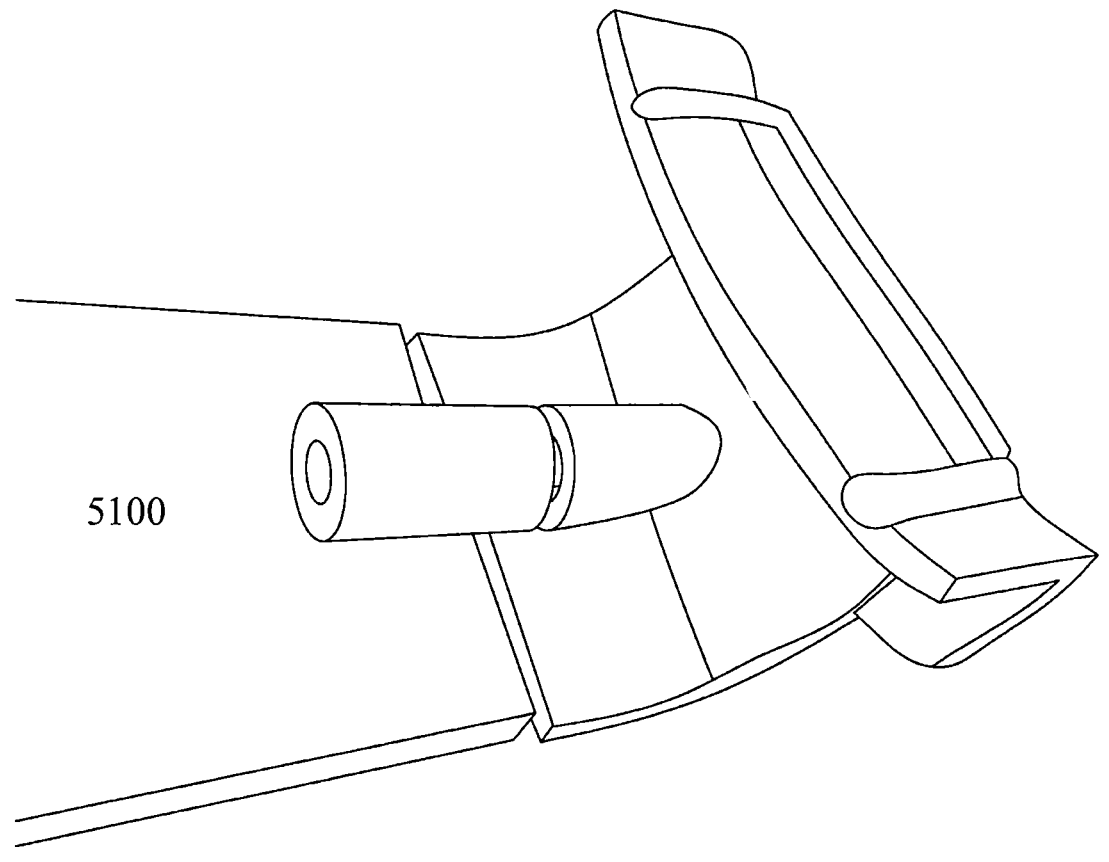
FIG. 7 is a perspective view of system 5000.

FIG. 7 is a perspective view of system 5000.

Figure 8:
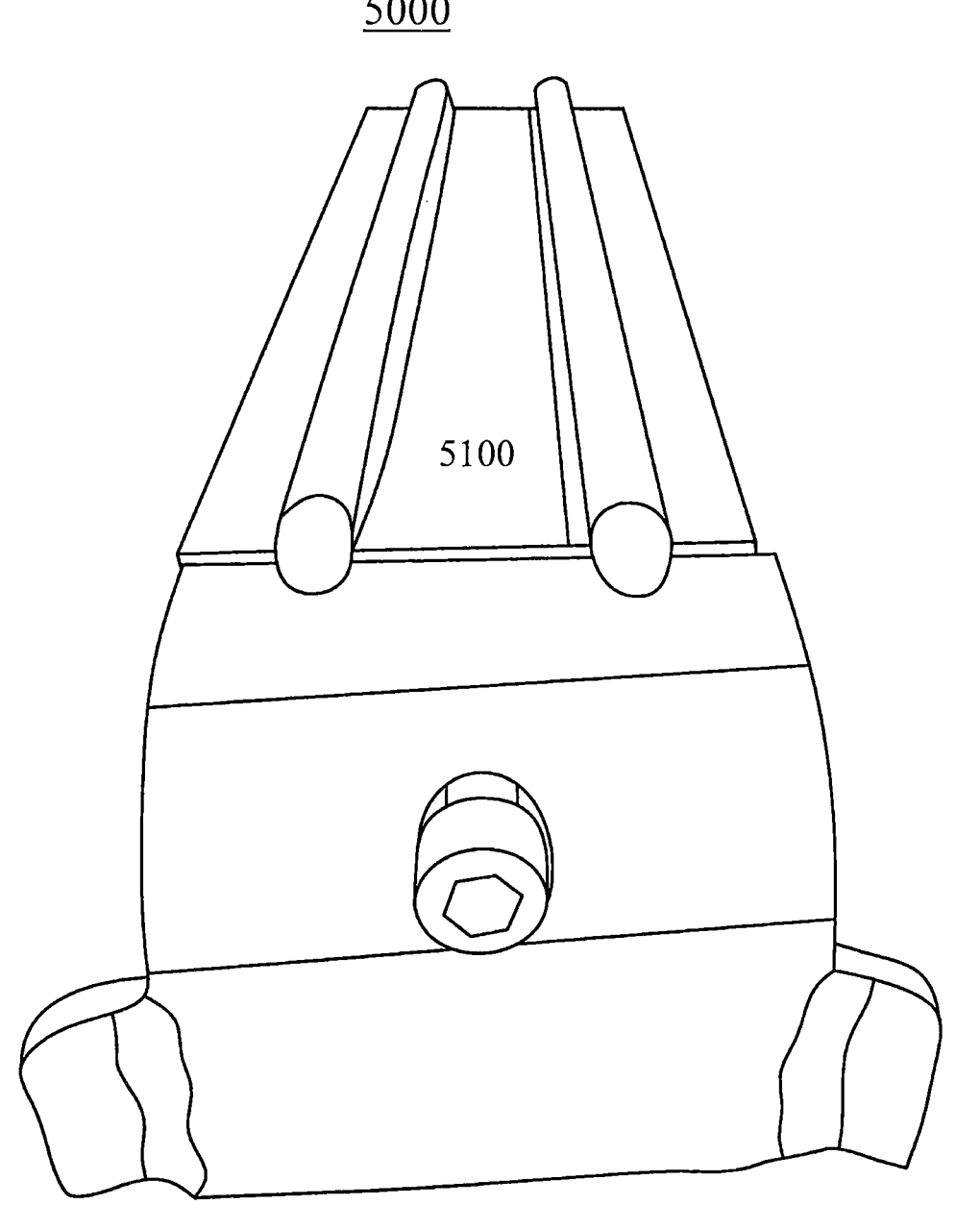
FIG. 8 is a perspective view of system 5000.

FIG. 8 is a perspective view of system 5000.

Figure 9:
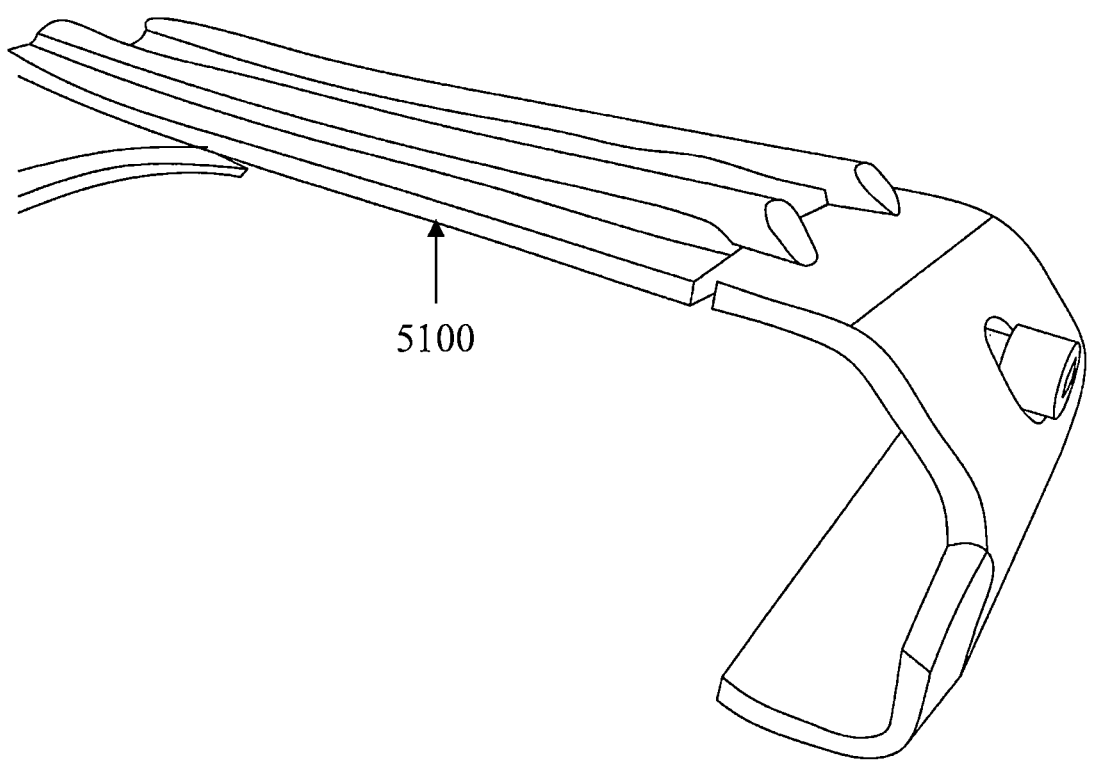
FIG. 9 is a perspective view of system 5000.

FIG. 9 is a perspective view of system 5000.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
  activity—an action, act, step, and/or process or portion thereof.
  adapter—a device used to effect operative compatibility between different parts of one or more pieces of an apparatus or system.
  adjacent—next to in position.
  along—at a point on.
  and/or—either in conjunction with or in alternative to.
  angle component—a metal piece having an L-shaped cross section.

apparatus—an appliance or device for a particular purpose.
  associate—to join, connect together, and/or relate.
  can—is capable of, in at least some embodiments.
  cap screw—a threaded bolt constructed to fasten machine parts.
  channel—a portion of a surface of an object having a cross section with a base and two upturned sides, wherein each of the two upturned sides joins the base at substantially right angles.
  cleat—a projecting piece that furnishes a grip for a system coupled to the cleat.
  comprising—including but not limited to.
  configure—to make suitable or fit for a specific use or situation.
  connect—to join or fasten together.
  constructed to—made to and/or designed to.
  countersunk—an enlarged and beveled at a rim of an aperture so that a fastener can be inserted without protruding from a surface or a beveled end of a fastener that is constructed to rest in the rim of the aperture.
  couple—to link in some fashion.
  coupleable—capable of being joined, connected, and/or linked together.
  define—to establish the outline, form, or structure of
  device—a machine, manufacture, and/or collection thereof.
  direction—a line along which something moves.
  edge—an outside limit of an object, area, or surface.
  end—a most extreme part of an object.
  engage—to be in contact and interact with.
  generate—to create, produce, give rise to, and/or bring into existence.
  grabber—a part of an object that is constructed to penetrate a surface and thereby increase traction.
  greater—larger in magnitude.
  head—a terminus of a fastener that is constructed to be engaged with a tool.
  increase—to become greater in magnitude.
  install—to connect or set in position and prepare for use.
  length—a longest extent of something as measured from end to end.
  may—is allowed and/or permitted to, in at least some embodiments.
  method—a process, procedure, and/or collection of related activities for accomplishing something.
  motion—a process via which something changes position from one location to another.
  mount—to couple to something.
  outer—situated so as to be closest to the earth's surface as an object moves.
  pair—two similar things used together.
  penetrate—to pass into or through.
  plurality—the state of being plural and/or more than one.
  portion—a part of a whole.
  predetermined—established in advance.
  protrude—to extend beyond or above a surface.
  provide—to furnish, supply, give, and/or make available.
  receive—to get, take, acquire, and/or obtain.
  relative to—in comparison with.
  restrain—to limit motion of something.
  retainer—a component that holds something in a manner that resists motion relative to the retainer.
  ridge—a part projecting from a surface of an object.
  segment—a piece of something.
  set—a related plurality.

skid-steer loader—a rigid-frame, engine-powered machine with lift arms used to attach a wide variety of tools or attachments.

socket head cap screw—a type of cap screw with a cylindrical head and hexagonal drive hole.

store—to place, hold, and/or retain.

substantially—to a great extent or degree.

support—to bear the weight of, especially from below.

surface—the outer boundary of an object or a material layer.

system—a collection of mechanisms, devices, machines, articles of manufacture, processes, data, and/or instructions, the collection designed to perform one or more specific functions.

thereby—by that means.

threaded—comprising projecting helical ribs via which are constructed to grip contacted surfaces.

threaded fastener—one (or more) restraints comprising projecting helical ribs via which parts can be screwed together, which restraints attach to, extend through, penetrate, and/or hold something and engage via. For example, a threaded fastener can be one (or more) of a bolt, a bolt and nut assembly and/or a screw, etc.

track—either of two endless belts on which a vehicle so equipped travels.

traction—adhesive friction of a body on a surface on which it moves.

transmit—to send, provide, furnish, and/or supply.

vehicle—a conveyance moving on tracks such as a skid steer loader, end loader, or tractor, etc.

via—by way of and/or utilizing.

width—an extent of something as measured from end to end as measured in a direction that is substantially perpendicular to a length of the something.

wrap—a single turn or convolution of component constructed to wind around an object.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:

a vehicle;

a track, the track coupleable to the vehicle;

a cleat, the cleat comprising a first portion and a second portion, the cleat coupleable to the track via coupling the first portion to the second portion, the first portion of the cleat comprising a first track retainer, the second portion of the cleat comprising a second track retainer, each of the first track retainer and the second track retainer constructed to wrap around an edge of the track, the first portion of the cleat comprising a first retainer ridge, the first retainer ridge constructed to engage with a first channel of the track, the first portion of the cleat comprising a first part of a second retainer ridge, the second portion of the cleat comprising a second part of the second retainer ridge, the second retainer ridge constructed to engage with a second channel of the track, wherein:

the first portion is coupleable to the second portion via a threaded fastener engaging with a threaded surface defined by the second retainer ridge; and when the first retainer ridge is engaged with the first channel of the track and the second retainer ridge constructed to engage with the second channel of the track, the cleat is restrained from motion in any direction relative to the track.

2. The system of claim 1, wherein:

the cleat comprises a pair of grabber ridges along a length of the cleat, the pair of grabber ridges constructed to penetrate unpaved surfaces and thereby increase traction of the cleat.

3. The system of claim 1, wherein:

each of the first track retainer and the second track retainer comprise an end portion having an angle component with a width that is greater than a width of a segment of the cleat that is adjacent to an outer surface of the track.

4. The system of claim 1, wherein:

the threaded fastener has a countersunk head.

\* \* \* \* \*